March 17, 1959     F. A. KROHM     2,877,659
CONTROL FOR USE WITH A WIPER MOTOR

Filed Oct. 11, 1954     3 Sheets-Sheet 1

INVENTOR.
FRED A. KROHM
BY
Charles S. Penfold
ATTORNEY

March 17, 1959  F. A. KROHM  2,877,659
CONTROL FOR USE WITH A WIPER MOTOR
Filed Oct. 11, 1954  3 Sheets-Sheet 2

INVENTOR.
FRED A. KROHM
BY Charles S. Penfold
ATTORNEY

March 17, 1959 F. A. KROHM 2,877,659
CONTROL FOR USE WITH A WIPER MOTOR
Filed Oct. 11, 1954 3 Sheets-Sheet 3

INVENTOR.
FRED A. KROHM
BY
Charles S. Penfold
ATTORNEY

United States Patent Office 2,877,659
Patented Mar. 17, 1959

2,877,659

CONTROL FOR USE WITH A WIPER MOTOR

Fred A. Krohm, Hobart, Ind., assignor, by mesne assignments, to The Anderson Company, a corporation of Indiana Original application June 21, 1949, Serial No. 100,445, now Patent No. 2,696,805, dated December 19, 1954. Divided and this application October 11, 1954, Serial No. 461,394

5 Claims. (Cl. 74—502)

This invention relates generally to stroke adjusting means for oscillatory power units, and more particularly, has to do with a windshield wiper motor of the fluid type.

This application is a division of my copending application Serial No. 100,445 filed June 21, 1949 (now Patent No. 2,696,805).

This application is also a continuation in part of applications Serial No. 83,896, filed March 28, 1949, and Serial No. 92,634, filed May 11, 1949.

A purpose of the subject invention is to greatly reduce the number of motors required to be carried in retail and wholesale replacement inventories, so as to encourage and enable a much larger number of wholesalers and retailers to provide such service, to the end that driving and walking on the streets and highways will become less hazardous.

Another object of the invention is to provide a driver member 93, as illustrated in Figure 4, said member having lugs 95 and 96 projecting through a guide plate and constructed and arranged to contact and urge forward inner portions of the internal cam member so that the over-all degree of arcuate movement of the windshield wiper arm may be varied to suit varying requirements of different motor vehicles. By this unique method and structure, a still further obstruction to universality of design and application of replacement windshield wiper motors of the vacuum type is substantially eliminated. It will be noted that the driver member, as shown in Figure 5, may be shifted and adjusted by a manual control element 203 preferably operating in conjunction with an eccentric.

A particular object of the invention is to provide a manual control on the motor, independent of the flexible control unit on the instrument panel, so that the rotational range of the motor shaft and the vane or piston may be varied and predetermined to meet different installation requirements.

A significant object of the invention is to provide a novel cover for the secondary valve operating mechanism, the cover serving a plurality of uses.

Other objects and advantages of the invention will become apparent after the description hereinafter set forth is considered in conjunction with the drawings annexed hereto.

Referring to the drawings, wherein like parts are designated by the same numerals, Figure 1 is a sectional view of the motor assembly, showing the means for shifting the stroke adjusting means from outside of cover 98;

The complete organization incorporating the parts of the present application is fully disclosed in said parent case Serial No. 100,445. For brevity certain ancillary parts of the complete apparatus are only touched upon here, and reference should be made to the parent case for full details.

Figure 3:
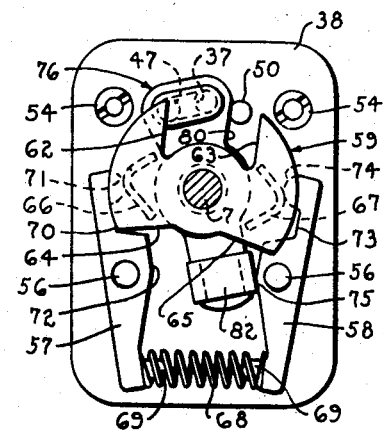
Figure 3 is a view of the snap valve mechanism with the actuator therefor and stroke adjusting element removed.

The motor structure exemplified includes, among other things, a housing 1, a mounting frame 3 permanently secured to the housing, a valve body 4 detachably secured to the motor cover, a primary or throttle valve 5 carried by the valve body, mechanism or valving device 6 shown in Figure 3 actuated by a driving shaft 7 for controlling a secondary valve 8.

Valve 5 is to be turned "on" or "off" to control operation and speed of the motor. In the present instance this is done by a flexible manually controlled cable device 143 connected to tab 117 of the valve.

Figure 1:
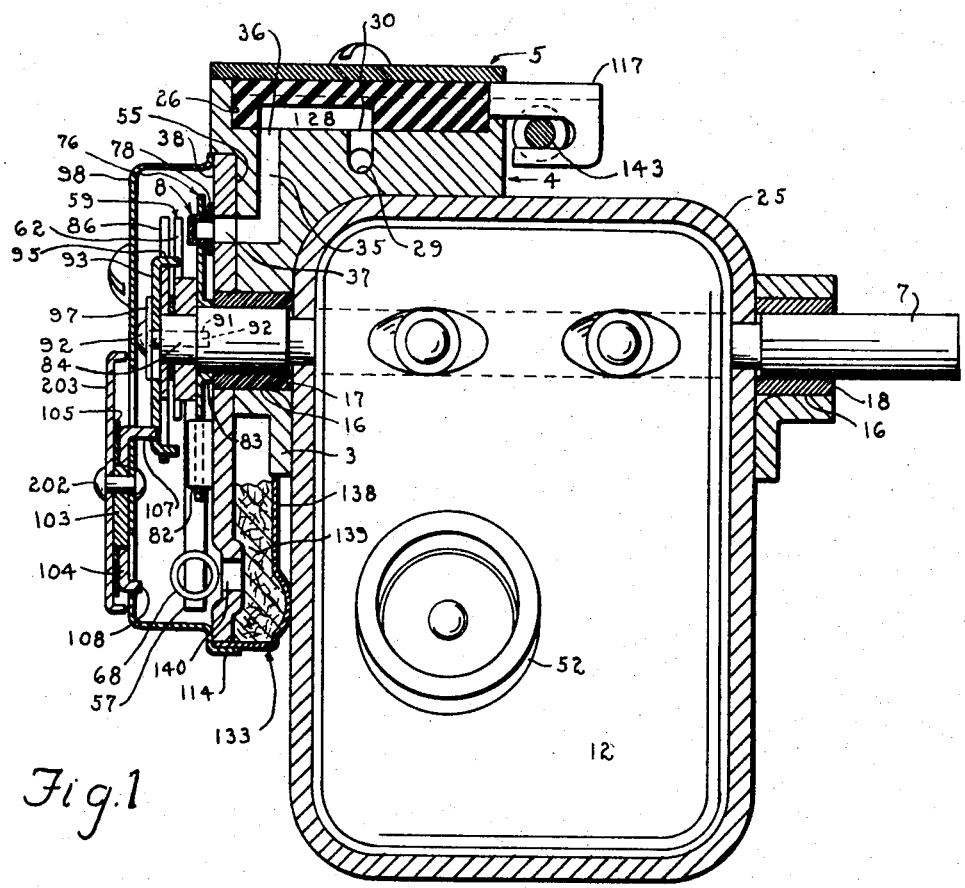
Figure 2:
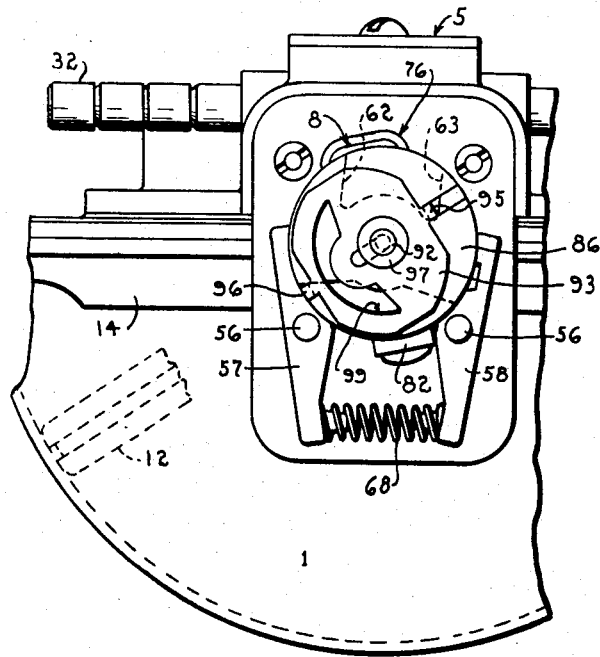
Figure 2 is a face view of the motor with the cover for the snap valve mechanism removed.

The upper part of the valve block is provided with a circular recess 26, as shown in Figure 1, which rotatably receives the throttle or primary valve 5 above referred to. As will be pointed out hereinafter, the valve block is provided with a plurality of passages which communicate with the recess 26 and the chamber or raceway and the secondary valve 8.

The mounting plate 38 and mechanism 6 are preferably associated together to constitute a subassembly which may be readily detachably connected to the motor block. As illustrated in Figure 1, the valve block is preferably recessed at 55. The cover and frame are also provided with recesses to receive the upper extremity of the mounting plate 38. With this arrangement, the subassembly is firmly interlocked with the valve block. This is important from the standpoint of maintaining the hole 37 and apertures 47 and 50 in the mounting plate in registry with the maching passageways in the valve blocks 35, 45 and 48, respectively.

Figure 4:
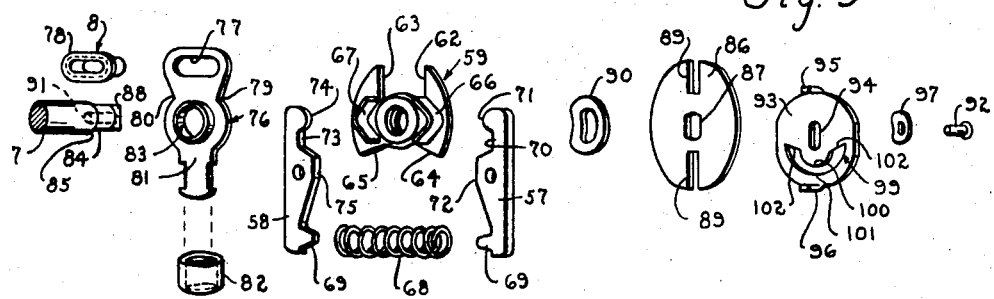
Figure 4 is an exploded view of parts of the secondary valve mechanism and manual control therefor.

The mounting plate is provided with an aperture which receives the shaft bearing 17, as shown in Figure 1. As illustrated in Figure 3, pivots 56 extend transversely through the mounting plate 38 and pivotally support a pair of corresponding rocker arms 57 and 58 for maintaining a cam member or kicker 59, rotatable on the shaft 7, in predetermined rotative positions in order that the fluid intended to circulate through certain of the passages will not be interrupted except at predetermined intervals. This cam member may be constructed as desired, but, as depicted in Figure 4, it is preferably made by stamping same out of sheet metal stock to provide a notch forming a pair of spaced apart substantially parallel abutments 62 and 63 adjacent one side of the member, and an interruption adjacent its opposite side to form a pair of spaced marginal edges 64 and 65. The inner face of member 59 is provided with rearwardly extending walls to form generally V-shaped cams 66 and 67. If found desirable, these cams may be constructed in the form of pins. The upper ends of the rocker arms 57 and 58 are continuously yieldably urged into engagement with the cams 66 and 67 by a helical expansible spring 68 carried by lugs 69 on the lower ends of the arms. The upper end of the rocker arm 57 is provided with a notch 70, a rounded abutment 71, and an abutment 72 adjacent the pivot 56. The rocker arm 58 is similarly provided with a notch 73 and abutments 74 and 75.

An elongated oscillating member 76, carrying the secondary valve 8, is also rotatably mounted on the motor drive shaft 7 (see Figures 4 and 1 respectively). This oscillating member is provided with an upper head portion having a slot 77 therein which loosely receives the valve 8. The body of the valve is of hollow construction and includes a flange 78 which is disposed between the oscillating member and the front face of the mounting plate in order to prevent escape of the valve. This valve is operable to alternately place the hole 37 in the mounting plate in communication with first one and then the other of the apertures leading to opposite sides of vane 12.

The oscillating member is provided with notches 79 and 80 adjacent the head portion and its other extremity or tail portion 81 is provided with a rubber bumper 82 in the form of a sleeve surrounding the tail. The tail is preferably notched as shown so that portions of the sleeve or tube will recede into the notches to automatically lock the tube in place. The upper marginal ends of the cams 66 and 67 are adapted to periodically engage the notches 79 and 80 to flip the oscillating member. If found desirable, the construction may be modified so that the lower marginal ends of the cams will periodically engage the tail 81 at the same time that the upper ends of the cams engage the notches 79 and 80, or the lower ends may act to flip the oscillating member in lieu of the upper ends. The oscillating member is also provided with a central tubular portion 83 which preferably engages the end of shaft bearing 17 to maintain the member in predetermined spaced operative relationship to the parts to be engaged thereby. It will be noted that the tubular portion 83 rides on the larger cylindrical portion of the shaft 7 whereas the cam member 59 rides on a reduced cylindrical portion 84 and engages the shoulder 85 between such cylindrical portions for predetermining the position of the cam member.

The adjustable means on the motor whereby any required rotational range or movement of the motor shaft and vane or piston may be obtained is unique in character and will now be described. A round guide plate 86, as shown in Figure 4, rotates with the shaft 7 by reason of an oblong center opening 87 in the plate which receives the reduced oblong end 88 of the shaft. The periphery of this plate is preferably interrupted by a pair of diametrically opposed corresponding slots 89 which are arranged in alignment with the oblong opening 87. A resilient metal washer 90 may be mounted on the shaft between the cam member 59 and the guide plate 86 in order to assist in reducing friction therebetween. An axial hole 91 is provided in the end of the shaft 7 and receives the shank of a headed pin 92.

A driver 93 preferably made in the form of a plate is provided with a central straight slot 94 which receives the pin 92. This driver is also provided with a pair of rearwardly extending diametrically opposed fingers 95 and 96 adjacent its periphery which are of a sufficient length to project through the slots 89 in the guide plate 86, and with finger 95 between the abutments 62 and 63 on the cam member 59 and finger 96 between the spaced marginal edges 64 and 65 adjacent the lower edge or side of such cam member. A small metal spring washer 97 is preferably mounted on the shank of the pin 92 and bears against the outer surface of driver 93 and the underside of the head of the pin 92 in order to assist in pressing the driver rearwardly and maintain the various parts of the actuating mechanism in proper assembly. The shank of the pin 92 is detachably held in the axial hole 91 of the shaft by a cover or shield 98, as shown in Figure 1, so that removal of the cover will permit disassembly of the actuating mechanism carried by the shaft 7. The driver is further provided with a curved slot 99 defined by an upper marginal arcuate edge 100 of a predetermined radius and a lower arcuate marginal edge 101 of a different radius and the ends of the curved slot terminate in abutments 102.

Figure 5:
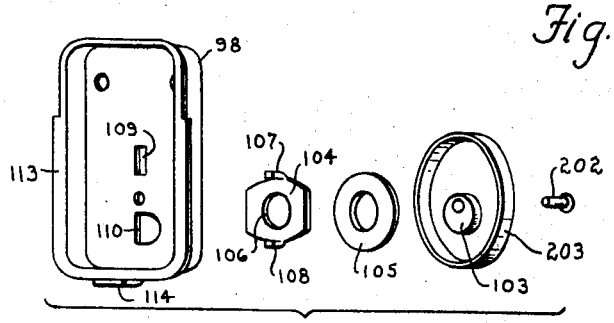
Figure 5 is an exploded view of those parts of the manual control for the secondary valve which are normally carried by the cover plate.
Figure 6:
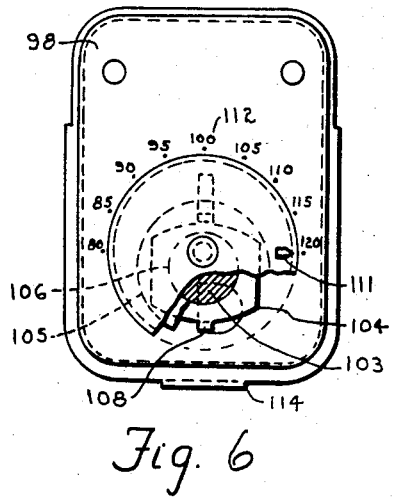
Figure 6 is a front view in elevation of a subassembly of the manual control embodying the parts illustrated in Figure 5 and a dialing setup.
Figure 7:
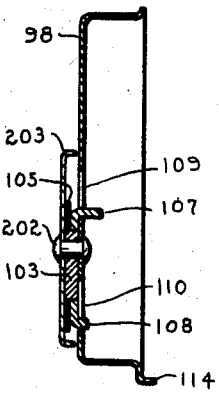
Figure 7 is a vertical section taken through Figure 6, exemplifying details of construction.

Movement of the driver 93 to obtain a desired range of rotational movement of the motor shaft is shown controlled by manually rotating a knob 203 carried by the cover 98, as shown in Figure 1. This knob is attached to the cover by a rivet 202 which extends through the knob and cover and also through a driver or eccentric 103 anchored for rotation with the knob. As shown in Figures 5 to 7 the eccentric, including an actuating element 104 and a resilient washer 105, are interposed between the front wall of the cover and the front wall of the knob. It will be noted that the washer bears against the knob and the actuating element for the purpose of obtaining sufficient friction to maintain the parts in position after they have been adjusted. The actuating element is provided with a circular aperture 106 which rotatably receives the eccentric and is further provided with a pair of diametrically opposed rearwardly extending lugs 107 and 108. The longer lug 107 projects through a vertical slot 109 in the cover and into the curved slot 99 of the driver 93 and the shorter lug 108 extends into a clearance 110, the latter being diametrically opposed to the slot 109. With this unique arrangement, the driver 93 is adapted for movement only in a plane parallel to the guide plate and transverse to the longitudinal axis of the motor shaft and the actuating element is limited to a generally vertical and swinging movement parallel to the cover and substantially transverse to the longitudinal axis of the rivet 202. The knob may be provided with an arrow or mark 111 and the cover with a dial 112 indicating various degrees of rotation for the motor shaft. The actions resulting from adjusting the control knob 203 to various positions will be described more in detail subsequently.

The shield 98 covers the valve operating mechanism 6 and includes a border flange 113 which is adapted to bear against mounting plate 38 and a lower inturned finger 114 which extends under and rearwardly of the plate. Screws 115 received in the outer internal threaded ends of screws 54 serve to detachably secure the shield 98 in place. The front wall of the shield as stated above, is adapted to be engaged by the headed pin 92 to retain parts of the secondary valve operating mechanism in proper assembly.

As clearly illustrated in Figure 1, means are provided for filtering air which is introduced through the apertures 47 and 50 provided in the mounting plate 38 leading to the interior of the housing. The cover 98 is adapted to bear relatively tight against the outer face of the mounting plate to provide a substantially fluid-tight construction so that any air that is admitted into the housing or raceway through the apertures in the mounting plate will have to pass through the filter. The filtering means includes a receptacle 133 having a bottom and end walls and a back wall 138. The end walls are provided with upwardly extending continuations. The end walls and the continuations are adapted to embrace the side edges of the mounting plate and the upper transverse marginal edge 138 of the back wall may engage the frame 3, as shown in Figure 1.

The annular recess 128, formed in the underside of the throttle valve 5, is at all times in communication with the vacuum means. When the throttle valve is in "off" position, the motor shaft will be held against movement to operate a wiper arm and blade, this being due to the fact that the recess 128 is not connected with the port in the motor block leading to the hole 37 in the mounting plate through passage 35. When valve 5 is in the "on"

position the vacuum line will be valved first to one side and then the other of vane 12 by the action of the snap valve mechanism described, to oscillate vane 12 so long as the valve is in the "on" position.

As briefly described above, the driver 93 movable with the shaft 7 serves to oscillate the cam member 59 relative to the shaft and when the cam member reaches a predetermined position, the spring 68 under compression will cause the rocker arms to snap the cam member against the oscillating member 76 which carries the secondary valve 8. More particularly, the guide plate 86 is keyed to the shaft 7 and the driver 93 to the plate by means of the fingers 95 and 96 extending through the slots 89. Since the driver moves with the shaft the finger 95 on the driver will alternately engage the spaced abutments 62 and 63 on the cam member. Assuming that the oscillating member 76 has been flipped to place the secondary valve in position to cause the vane to be pulled toward the left, the cams 66 and 67 on member 59 will be located in a position just the reverse of Figure 3. As the shaft 7, guide plate 86, driver 93 and vane 12 rotate clockwise, the oscillating member 76 and cam member 59 will remain stationary until the upper finger or lug 95 on the driver 93 engages the abutment 63 on the cam member, whereupon the cam member is rotated along with the driver causing the cam 66 to move out of the notch 70 in the rocker arm 57 and cam 67 to act against abutment 74 on arm 58. This movement of the cam member 59 causes the upper extremities of the rocker arms to spread apart or diverge and compress the spring 68 as viewed in Figure 3, and the instant the cams ride over the abutments 71 and 74 and beyond center, the arms will snap the cam 66 on member 59 against the notch 79 on the oscillating member 76 to cause the latter to flip over so that the secondary valve 8 will cover hole 37 and aperture 50, after which the vacuum will cause the vane to be moved back to the right in a counterclockwise direction. When the hole 37 and aperture 50 are so covered, the cam 67 will be seated in notch 73 of rocker arm 58 and cam 66 against the abutment 71 on arm 57 and rubber bumper 82 against abutment 72 on arm 57. As the shaft 7, driver 93, guide plate 86 and vane 12 travel in the counterclockwise direction just stated, the oscillating member 76 and cam member 59 will remain stationary until the finger 95 on the driver engages the abutment 62 on member 59 whereupon the member is rotated along with the driver causing the cams 66 and 67 to urge the upper extremities of the rocker arms 57 and 58 outwardly to compress the spring 68 and the instant the cam member 59 is moved past center, it will be thrown to snap cam 67 against the notch 80 of the oscillating member 76 to flip the latter back to a position where secondary valve 8 will again cover hole 37 and aperture 47.

If found desirable, the parts could be so designed and constructed that the lower finger 96 on the driver would engage the lower marginal edge 64 on the cam member at the same time that finger 95 engages abutment 63 and the same applies with respect to the marginal edge 65 and abutment 62, or the arrangement may be such that the lower finger 96 will alternately engage the edges 64 and 65 in lieu of the finger 95 engaging abutments 62 and 63.

It is to be noted that the points of engagement between the finger 95 on the driver and the abutments 62 and 63 on the cam member are adjacent to the base of the notch which forms the abutments 62 and 63 and are relatively close to the axis of the shaft 7.

As stated above, one of the important objects of the invention is to provide a unique arrangement whereby the range of rotational movement of the shaft and vane may be varied, within practicable limits, to meet different installation requirements. Thus, one motor equipped with the manual control of the subject invention exemplified may be installed in any one of a considerable number of different types, makes or models of automotive vehicles.

With such a motor, the replacement setup is improved as described at the beginning of this specification. This manual control is operable independently of the control of tab 117 and as pointed out above is preferably primarily carried by the cover 98 shielding the secondary valve actuating mechanism.

Figure 8:
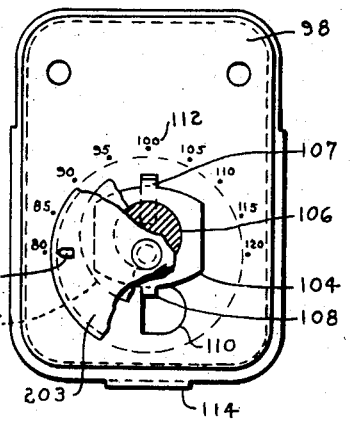
Figure 8 is a front view, similar to Figure 6, illustrating different positions of certain parts.
Figure 9:
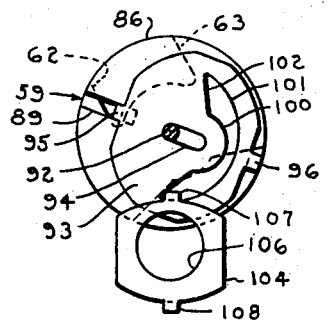
Figures 9 through 12 illustrate the cooperative relationship between the manual subassembly depicted in Figures 6, 7 and 8, and those components operatively connected with the secondary valve mechanism shown in Figure 4, whereby one may obtain a desired range of rotation of the motor shaft and the vane.
Figure 10:
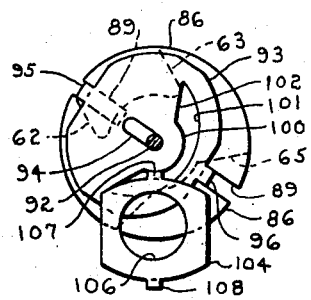
Figure 11:
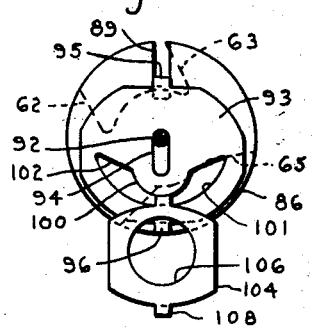
Figure 12:
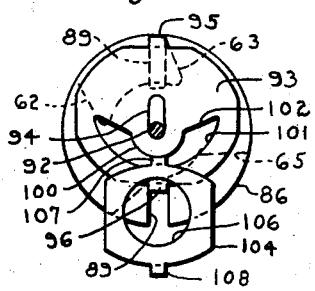

This manual control may be operated by merely manipulating the knob 203. When, for example, a particular installation requires that the motor shaft oscillate within the maximum range of 120 degrees, the knob will be located so that the arrow 111 thereon will register with the 120 degree mark on the cover as illustrated in Figure 6, in which position the upper finger 95 on the driver will be located as shown in Figures 9 and 11 and the upper lug 107 on the actuating element 104 will be arranged adjacent to the lower marginal arcuate edge 101 of the curved slot 99 in the driver. If, for example, the installation requires the minimum range of 80 degrees, the knob will be turned to place the arrow opposite the 80 degree mark as illustrated in Figures 8, 10 and 12, in which position the finger 95 on the driver 93 will be located a greater radial distance from the axis of the shaft 7 and consequently, such finger will alternately engage the outer extremities of the abutments 62 and 63 to cause the driver, guide plate and vane to travel a shorter rotational distance than when the control is set for a maximum range. This difference in rotational ranges is due to the fact that the driver is adjustable with respect to the cam member so that the finger 95 may, within practicable limits, be moved to any one of a number of infinite radial distances from the shaft axis to obtain a rotational range within 80 to 120 degrees as illustrated. It will be noted that the faces of the abutments 62 and 63 are arranged at an angle with reference to a line passing through the fingers 95 and 96 on the device so that the upper finger 95 will travel a shorter circumferential distance to engage the abutments when located farther away from the shaft axis as shown in Figure 10 than when closer as depicted in Figure 9. Obviously, the components employed to obtain the rotational ranges just referred to may be modified to obtain a range less than 80 degrees or in excess of 120 degrees.

When the installation requires that the motor should function to rotate its shaft and a wiper arm operatively connected thereto within a range less than the maximum, the knob will be rotated so that the upper lug 107 on the actuating element 104 will forcibly engage the upper marginal edge 100 of the curved slot 99 provided in the driver 93 to move the finger 95 on the driver outwardly whereby the finger may alternately engage the abutments 62 and 63 on the cam member. The finger 95 may be pulled back to obtain the maximum rotational movement of the shaft, by manipulating the knob so that the lug 107 will be drawn against the lower marginal edge 101 of slot 99. The straight marginal edge of the opening 110 in the cover 98 provides a stop for the lower lug 108 of the actuating element 104 but it is to be understood that other means suitable for the purpose may be employed to limit movement of the actuating element when operated by the eccentric 103. The opening 110 also provides clearance for the lug 108 in order that the actuating element may be pivoted by the eccentric 103 and at the same time slide relative to the cover 98. As pointed out above, the upper and lower marginal edges 100 and 101 of the curved slot 99 are of different radial dimensions and as a consequence, the marginal edges are located closer together at a point substantially in alignment with the fingers 95 and 96 and straight slot 94. Accordingly, the space between the marginal edges at such point is of a size to accommodate the upper lug 107 of the actuating element in order to hold the cam member and actuating element assembled to obtain proper mechanical adjustment and movement therebetween. This manual control assembly has proven satisfactory in use and provides means whereby the rotational range of movement of the vane may be readily varied before or while the motor is in operation although in the majority of installations the control will be set for a predetermined range prior to installation. This manual control is entirely independently operable of the control unit 9.

It will be noted that as wear, stretch or other abnormal conditions in the transmission mechanism between the motor and the windshield wiper blade develop so as to create "slap" permitting the wiper arm and/or blade to slap the windshield wiper frame objectionably when the wiper is in operation, this control may be adjusted to shorten the rotational arc of the wiper blade to prevent such "slap." This is a rather prevalent condition affecting certain original types of installation.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described and defined in the claims.

I claim:

1. A control for use with a wiper motor comprising a cover provided with a pair of aligned openings, an actuating member engaging one side of the cover and having a pair of projections extending into the openings, an eccentric member engaging the actuating member, a knob member surrounding the eccentric member, a driver arranged on the other side of the cover opposite the projections, means for maintaining the members assembled with the cover whereby manipulation of the knob will cause the eccentric to move the actuating member so that its projections will operate the driver, and friction means for holding the knob in place after adjustment.

2. A control for use with a wiper motor comprising a support provided with an oblong opening, means for attaching the support to the motor, an actuating part on one side of the support and provided with a round opening, a movable member disposed in the round opening, a knob member carrying said movable member, a driver part arranged on the other side of the support, means extending from one of said parts through the oblong opening cooperating with the other part, means for maintaining the members and parts assembled with the support whereby manipulation of the knob member will cause the movable member to move the actuating part so that the extending means will slide in the oblong opening and operate the driver part, and friction means for holding the knob in place after adjustment.

3. A control for use with a vacuum operated windshield wiper motor having a cover fitted over its valve snapping mechanism, comprising an actuating member slidably engaging the outer face of said cover and having at least one projection extending through an elongated slot formed in said cover, an ecentric member engaging the actuating member, a knob member rigid with and surrounding the eccentric member, means including a friction device for maintaining the members assembled with the outer face of the cover so that rotation of the knob will cause the eccentric to shift said actuating member along said slot, a driver arranged within the cover and having an arcuate slot formed therein in which said projection is to engage.

4. Means for shifting the adjusting means of a vacuum operated windshield wiper motor having an oscillatory vane operated shaft, controlled by snap action valve means, which valve is snaped by a cam or kicker element actuated through a variable amplitude element, said valve elements being shielded by a cup-shaped cover fitted to the motor body, comprising an actuating member engaging the outer wall of said cover and having a part projecting through an elongated slot in said cover, an eccentric member disposed exteriorly of the cover and engaging the actuating member, a knob connected to the eccentric, means maintaining said members assembled to the cover whereby manipulation of the knob will cause the eccentric to shift the actuating member, a driver member arranged within the cover and having an arcuate slot formed therein in which the projection of said actuating member is received, a guide plate having a central aperture mounting it against rotation on the motor shaft, said guide plate being formed with slots aligned with said central aperture, said driver member having lugs extending through said slots in the guide plate and one of said lugs engageable with said cam member of the valve mechanism, and comprising said variable amplitude element.

5. A mechanical system for shifting the position of the variable amplitude element controlling the snap valve mechanism of a vacuum wiper motor, comprising a cover for fitting against the motor and enclosing said valve mechanism, a cupped knob having its edge disposed contiguous the outer wall of said cover, there being an elongated slot in said cover, an actuating member enclosed between said knob and cover and having a projection extending through said slot for engagement in a slot formed in said amplitude element, means also enclosed by said knob for converting rotation of said knob into movement of said member along said slot, and means including a friction device between the knob and actuating member for holding the members to the cover as a unit and against displacement by vehicle jarring.

References Cited in the file of this patent

UNITED STATES PATENTS

| | | |
|---|---|---|
| 1,509,472 | Carey | Sept. 23, 1924 |
| 1,639,885 | Gammeter | Aug. 23, 1927 |
| 2,590,475 | Staltenberg | Mar. 25, 1952 |
| 2,696,805 | Krohm | Dec. 14, 1954 |
| 2,697,419 | Krohm | Dec. 21, 1954 |
| 2,704,331 | Stott et al. | Mar. 15, 1955 |
| 2,771,784 | Diehel | Nov. 27, 1956 |

FOREIGN PATENTS

| | | |
|---|---|---|
| 535,687 | France | Jan. 30, 1922 |

UNITED STATES PATENT OFFICE

CERTIFICATE OF CORRECTION

Patent No. 2,877,659                                  March 17, 1959

Fred A. Krohm

It is hereby certified that error appears in the printed specification of the above numbered patent requiring correction and that the said Letters Patent should read as corrected below.

Column 2, lines 50 and 51, strike out "maching passageways in the valve blocks 35, 45 and 48, respectively." and insert instead -- matching passageways in the valve block. --.

Signed and sealed this 3rd day of May 1960.

(SEAL)
Attest:

KARL H. AXLINE                                 ROBERT C. WATSON
Attesting Officer                              Commissioner of Patents